(12) United States Patent  (10) Patent No.: US 6,717,710 B2
Park                        (45) Date of Patent:    Apr. 6, 2004

(54) ELECTRO-MODULATING DEVICE

(75) Inventor: Christopher Anthony Park, Stowmarket (GB)

(73) Assignee: Agilent Technologies, Inc., Palo Alto, CA (US)

(*) Notice: Subject to any disclaimer, the term of this patent is extended or adjusted under 35 U.S.C. 154(b) by 68 days.

(21) Appl. No.: 10/046,349

(22) Filed: Jan. 14, 2002

(65) Prior Publication Data

US 2002/0114055 A1 Aug. 22, 2002

(30) Foreign Application Priority Data

Feb. 16, 2001 (EP) .............................. 01301351

(51) Int. Cl.[7] .............................. G02F 1/07; G02F 1/035
(52) U.S. Cl. ........................ 359/245; 359/246; 359/247; 359/248; 359/251; 385/2
(58) Field of Search ................................ 359/245, 246, 359/247, 248, 251, 315, 118, 237, 181, 279, 238, 252; 385/2, 3, 9, 31, 32; 372/26–28

(56) References Cited

U.S. PATENT DOCUMENTS 3,748,597 A     7/1973  Reinhart .............. 359/279
4,950,884 A  *  8/1990  Banks .................. 359/389
5,886,807 A  *  3/1999  Cummings ............ 359/263

FOREIGN PATENT DOCUMENTS

JP        09258148      3/1997

OTHER PUBLICATIONS

Diot, T., Examiner. European Search Report, Application No. EP 01 20 1351, dated Jul. 30, 2001.
Yamada K. et al. "Double Pass EA Modulator Array Monolithically Integrated with Passive–Waveguide," vol. E81–C, No. 8, pp 1245–1250, XP000848528, Aug. 1998.
Sawada T. et al., "Ultrathin (5 MUM) Flexible Reflective Waveplate of Fluorinated Polyimide and Elimination of Polarization Sensitivity in Titanium–Diffused Lithium Niobate Waveguide Circuits," vol. 37, No. 12A, pp. 6408–6413, XP000927313, Dec. 1998.

* cited by examiner

Primary Examiner—Georgia Epps
Assistant Examiner—M. Hasan

(57) ABSTRACT

An electro-modulating device for modulating light from a light source, as part of an opto-electronic communication network has a modulating medium for modulating light passing therethrough by varying an electric field applied across the modulating medium, an optical input-output surface, a light reflector, and electrodes for applying the varying electric field across the modulating medium. The input-output surface, the medium and the reflector are arranged so that light enters the medium through the input-output surface, travels through the medium towards the reflector, is reflected by the reflector to travel back through the medium towards the input-output surface, and exits the medium through the input-output surface. The electric field is transverse to light traversing the medium between the input-out surface and the reflector, to make it easier to couple an optic fiber to the input-output surface of the modulating medium.

18 Claims, 2 Drawing Sheets

ELECTRO-MODULATING DEVICE

BACKGROUND OF THE INVENTION

1. Field of the Invention

The present invention relates to an electro-modulating device for modulating light from a light source, in particular to an electro-modulating device for use as part of an opto-electronic communication network.

2. Discussion of the Background Art

In an opto-electronic communication network, it can be desirable to modulate light by passing the light through a modulator. Normally the modulator is formed from a modulator material whose optical properties depend on the electric field applied across it, so that modulating the electric field across the modulator material results in a modulation in the intensity and/or phase of light passing through it.

It is known to modulate light with a modulator having a light input and a light output. One optic fibre is coupled to the modulator input so that light of constant intensity can be passed into the modulator, and another optic fibre is coupled to the modulator output so that modulated light leaving the modulator can be received. This requires two fibres to be coupled to the modulator.

SUMMARY OF THE INVENTION

It is an object of the present invention to address the above issues.

According to the present invention, there is provided an electro-modulating device comprising a modulating element, the modulating element having a modulating medium for modulating light passing therethrough, an optical input-output surface by which light both enters the medium prior to modulation of the light and exits the medium after modulation of the light, a light reflector, and electrodes for applying an electric field across the modulating medium, wherein:

the input-output surface, the medium and the reflector are arranged so that light enters the medium through the input-output surface, travels through the medium towards the reflector, is reflected by the reflector to travel back through the medium towards the input-output surface, and exits the medium through the input-output surface;

the electric field is transverse to the direction of propagation of the light traversing the medium between the input-output surface and the reflector; and the refractive index of the medium is responsive to the applied electric field so that the intensity and/or phase of the light exiting the input-output surface is dependent on the applied electric field.

It will be appreciated that the light may be visible but may alternatively be invisible electromagnetic radiation, such as infra red radiation.

The term refractive index is intended to include the real part and/or the imaginary part thereof, such that a change in the refractive index of the modulating medium can result in a change in the phase and/or intensity of light passing therethrough.

Only a single optic fibre needs to be coupled to the electro-modulating device, since the input-output surface serves as both an input and an output.

Because the electric field is transverse to the direction of light traversing the modulating medium, it will be easier to position the electrodes such that they are less likely to cause an obstruction to the entry and exit of light into and out of the modulating medium.

The effective path length of light travelling through the modulating medium will be approximately twice the distance between the optical input-output surface and the reflector, thereby increasing the magnitude of the modulation achieved with the electro-modulating device, or reducing the voltage that needs to be applied to the electro-modulating device to a achieve a given degree of modulation.

Preferably, the modulating element will be formed from a section of semiconductor wafer and the modulating medium will be formed from an active layer on or in the semiconductor wafer, the active layer having a plurality of edges and the input-output surface residing on an edge of the active layer. If an optic fibre having an end portion is used to feed light into and out of the modulating medium, the end portion of the fibre can conveniently be positioned close to the input-output surface, in line with and parallel to the active layer forming the modulating medium, thereby making it easier to connect the electro-modulating device to the optic fibre.

If the modulating element is formed from a semiconductor wafer, the modulating medium may be an active layer situated between a first layer of conducting semiconductor and a second layer of conducting semiconductor, the first and second layers of conducting semiconductor forming the electrodes for applying an electric field across the active layer, normal to the active layer. Since the conducting layers of semiconductor can be very close to one another on either side of the modulating medium, the electric field applied across the modulating medium will be increased.

The modulating element may be a mesa with side walls etched on the semiconductor wafer, such that the edges and/or ends of the active layer lie on the side walls of the mesa. The mesa may be buried, or the modulating element may be formed by a ridge structure.

Alternatively, the edge of the active layer may reside on cleaved side walls formed by cleaving the wafer.

The electro-modulating device will preferably include a mounting surface on which there is mounted the modulating element. The mounting surface will preferably have a clamp, housing, adhesive area or other securing means for securing the end portion of an optic fibre such that light from the fibre can be coupled into and out of the modulating medium through the input-output surface. In a preferred embodiment, the mounting surface will be formed by a silicon substrate having a V-groove etched thereon for receiving the end portion of an optic fibre.

The mounting surface may have a light guide formed thereon for guiding light into and out of the modulating element. The modulating element may be integrally formed with the mounting surface, which will preferably be a semiconductor substrate. If the modulating element and the mounting surface are integrally formed, the modulating medium and the light guide will preferably be formed from a continuous layer of semiconductor.

The substrate may be formed from layers of silicon and silicon oxides and/or nitrides in which case the light guide may be defined on the substrate by etching.

The reflector may be formed by at least one layer of reflective material deposited on an end wall of the modulator element, or alternatively the reflector may be mounted on the mounting surface, facing an end wall of the modulator element. The reflector may be in contact with the active layer or there may be a gap between the active layer and the reflector. It will be appreciated that the reflector need not be entirely reflective and may allow some transmission therethrough.

The reflector may be a distributed bragg reflector having a plurality of layers, or the reflector may be a layer of metal, deposited on an end wall of the modulator element. A layer of insulator may be provided between the metal layer and the end wall of the modulator element to reduce the risk of the electrodes on the modulator element being short circuited by the metal layer.

The modulating medium will preferably be an electro-optic material, preferably semiconductor such as GaAs or InP, or a semiconductor containing In, Ga, As, and P or Al. If the electro-modulating device is intended to modulate the intensity of light, the modulating medium will preferably be a material whose absorption coefficient is dependent on the applied electric field. If the electro-modulating device is intended to modulate the phase of the light, the modulating medium will be a material where at least the real part of the refractive index changes with applied electric field. The modulating layer may have a multiple quantum well layer.

In a preferred embodiment, the modulating element is formed from a semiconductor wafer wherein the modulating medium is formed from a multiple quantum well layer of InGaAsP, and each electrode is formed from a layer of conducting InP. The modulating medium may be doped with one polarity of doping and the electrodes may be doped with an opposite polarity of doping in order to form a p-n junction between each electrode and the modulating medium.

The modulating element may be formed from a polymeric material, and may be coupled with a waveguide also formed from a polymeric material.

BRIEF DESCRITPION OF THE DRAWINGS

The invention will now be described by way of example with reference to the following drawings in which.

DETAILED DESCRIPTION OF THE INVENTION

Figure 1:
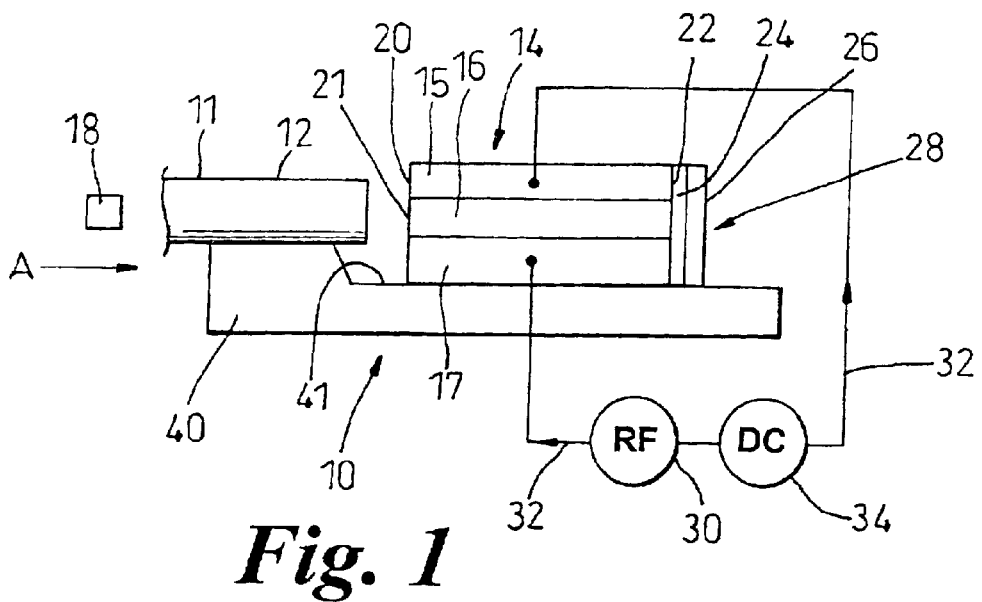
FIG. 1 shows a schematic side view of an electro-modulating device according to the invention.

In FIG. 1, there is shown a schematic side view, not to scale, of an electro-modulating device 10 having one end 11 of an optic fibre 12 mounted thereon. A light source 18 at another end of the fibre 12 produces infra red light which travels down the optic fibre 12 and into the electro-modulating device 10. The electro-modulating device 10 has modulating element 14 formed from a cleaved section of semiconductor wafer having an upper layer 15 of conducting InP, an active middle layer multiple quantum well layer 16 of InGaAsP, and a lower layer 17 of conducting InP. The modulating element 14 has a front end wall 20 and a back end wall 22, both of which are cleaved. On the back end wall 22, there has been deposited a dielectric layer 24, which in this example is Alumina, followed by a layer of metal 26. The dielectric layer 24 and the metal layer 26 together form a reflector 28.

Light from the optic fibre 12 enters the active middle layer 16 through the front wall 20, the area where the active middle layer 16 intersects the front wall 20 serving as an optical input-output 21. The light travels through the middle layer 16 towards the reflector 28, and is reflected back towards the front wall 20, where it exits the modulator element 14 and returns into the optic fibre 12. When travelling through the middle layer 16, the light is at least partially confined therein by the upper layer 15 and the lower layer 17, which act as confining layers because of their different refractive index with the respect to the middle layer 16.

A radio frequency voltage source 30 is connected to the upper layer 15 and the lower layer 17, the upper and lower layer 15,17 acting as electrodes such that a radio frequency voltage signal 32 applied between the upper and lower layers 15,17 results in a corresponding electric field across the middle layer 16. The optical properties of the active middle layer 16 are dependent on the electric field applied across it, with the result that the intensity or phase of the light travelling through the middle layer 16 is modulated by the radio frequency voltage source 30. Typically, the radio frequency voltage source will operate at a frequency of 10 GHz or more.

A dc voltage source 34 may be provided in series with the radio frequency voltage source 30 such that the radio frequency voltage signal 32 contains a dc component superposed with an ac component. The dc component applied to the active middle layer 16 will change the wavelength position of the absorption edge of this layer. If the electro-modulator is to be used in an intensity-modulating mode where the intensity of light is modulated, the dc component will be chosen such that the wavelength of the absorption edge in the InGaAsP is close to the wavelength of the light. If the electro-modulator is to be used in a phase-modulating mode where the phase of light is modulated, the dc component will be chosen such that a small changes in the electric field across the middle layer will cause a significant change in at least the real part of the refractive index of the middle layer.

Figure 2:
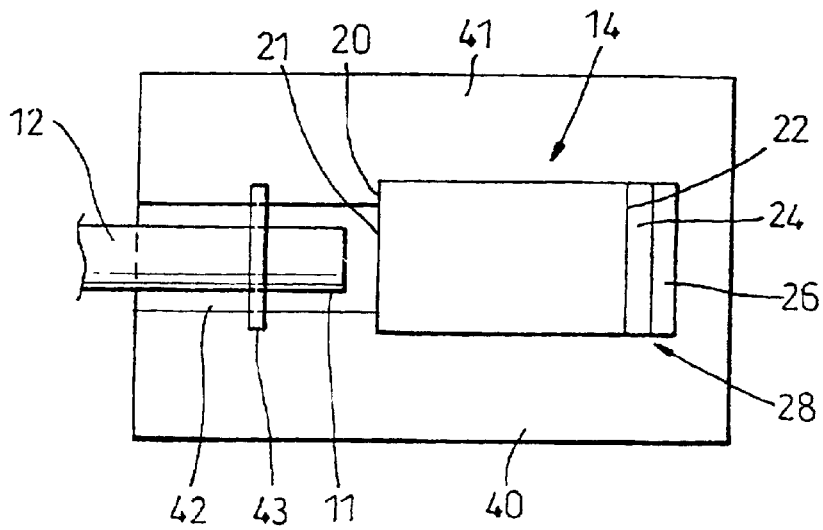
FIG. 2 shows a plan view of the electro-modulating device of FIG. 1.
Figure 3:
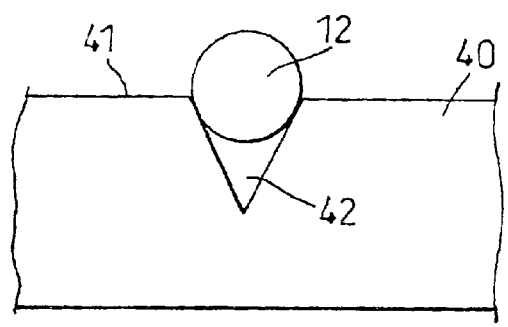
FIG. 3 shows a view of a portion of the electro-modulating device of FIG. 1 looking in the direction marked A.

As can be seen from FIGS. 1 to 3, the modulating element 14 is mounted on a substrate 40 made from silicon, the modulating element being secured to the substrate with AuSn solder. The substrate has a groove 42 etched therein for receiving the optic fibre. The groove 42 is positioned relative to the front face 20 of the modulating element 14 such that when the end 11 of the optic fibre 12 is located in the groove 42, the fibre end 11 is pointing towards the optical input-output 21 of the modulating element. A clamp 43 or other securing means may be used to secure the end 11 of the fibre 12 in the groove 42.

The distance between the front wall 20 and the back wall 22 of the modulator element is about 300 μm, and the combined thickness of the upper layer 15, the middle layer 16 and the lower layer 17 is about 100 μm. The middle layer 16 is about 0.5 μm thick.

Figure 4:
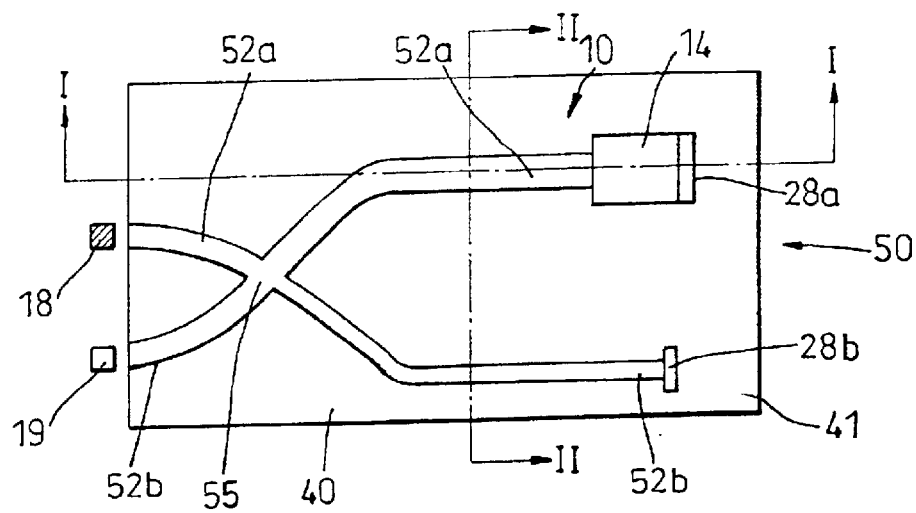
FIG. 4 shows a schematic plan view of a interferometer having an electro-modulating device.

FIG. 4 shows a plan view of a Mach-Zehnder interferometer 50 having an electro-modulating device 10 integrally formed therewith. The interferometer 50 is formed on a substrate 40 onto which there has been grown a lower semiconductor 17 layer followed by a light guide layer 16. As can be seen from FIG. 5, the light guide layer 16 has been partially removed so as to leave two strips which act respectively as a first light guide 52a and a second light guide 52b, the two light guides 52a, 52b coming together at a cross junction 55.

Towards the end of the first light guide 52a, there is situated the electro-modulating device 10. The electro-modulating device 10 is integrally formed with the interferometer 50, having a substrate 40 and lower electrode layer 17 that are common with interferometer 50. The modulating medium of the electro-modulating device 10 is formed from a portion 16b of the light guide layer 16, the first light guide 52a and the modulating element 16b being integrally formed. An upper electrode 15 is provided above the modulating medium 16b, the upper electrode 15 being formed from a conducting layer of semiconductor which has been removed except in an area above the modulating medium 16b. A voltage source 30, here a radio frequency voltage source, is connected to the upper electrode 15 and the layer 17 forming the lower electrode, so as to apply an electric field across the modulating medium 16b. The refractive index of the modulating medium 16b is dependent on the electric field applied across it, such that the phase of the light exiting the electro-modulation device is also dependent on the applied electric field.

A first reflector 28a is positioned at the end of the modulating medium 16b, such that one part of the light from a light source 18 travelling down the first light guide 52a enters the electro-modulating device 10 and is reflected back towards the light source by the first reflector 28. Another part of the light from the light source 18 enters the second light guide 52b at the junction 55 and is reflected back by the second reflector 28b. At the cross junction 55 where the reflected light travelling down the first light guide 52a meets with the reflected light travelling down the second light guide 52b, the light amplitude will depend on the electric field applied across the modulating medium 16b. Hence the amplitude of light from the cross junction 55 reaching a detector 19 will be modulated by the electro-modulating device 10. This light may conveniently be used to monitor the performance of the system or may be coupled to optic fibre and used as an output.

Figure 5:
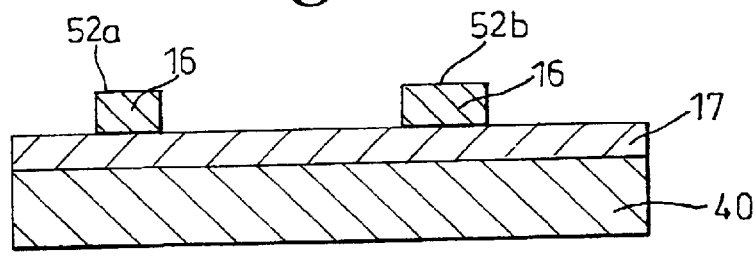
FIG. 5 shows a cross sectional view through the interferometer of FIG. 4 along the line II—II; and, FIG. 6 shows a cross sectional view along the line I—I of FIG. 4; and, FIG. 7 shows a cross sectional view through an electro-modulating device with a buried middle layer.
Figure 6:
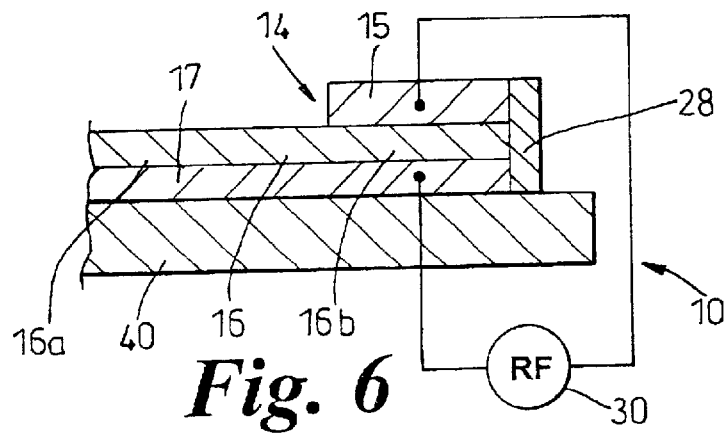

It will be appreciated that the electro-modulating device 10 shown in FIG. 5 need not be integrally formed with an interferometer, and that the light guide 52a extending from the electro-modulating device may be coupled to another opto-electronic device.

Figure 7:
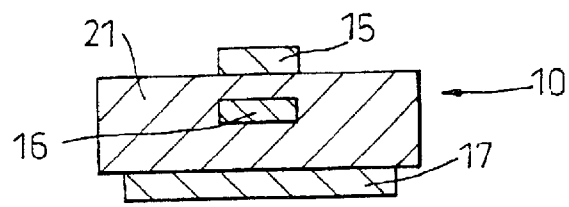

In FIG. 7, there is shown a cross sectional view of an electro-modulating device 10 having a modulating medium in the form of a strip 16 of a first semiconductor buried in a region of a second semiconductor 21. An upper electrode 15 is provided above the strip 16 and a lower electrode 17 is provided below the strip 16 for applying a modulation voltage to the strip 16.

I claim:

1. An electro-modulating device comprising a modulating element, the modulating element having a modulating medium for modulating light passing therethrough, an optical input-output surface by which light both enters the medium prior to modulation of the light and exits the medium after modulation of the light, a light reflector, and electrodes for applying an electric field across the modulating medium, wherein:
   the input-output surface, the medium and the reflector are arranged so that light enters the medium through the input-output surface, travels through the medium towards the reflector, is reflected by the reflector to travel back through the medium towards the input-output surface, and exits the medium through the input-output surface;
   the electric field is transverse to the direction of propagation of light traversing the medium between the input-output surface and the reflector; and
   the refractive index of the medium is responsive to the applied electric field so that the intensity and/or phase of the light exiting the input-output surface is dependent on the applied electric field,
   wherein the modulating element is formed from a section of semiconductor wafer and the modulating medium is formed from an active layer on or in the semiconductor wafer, the active layer having a plurality of edges and the input-output surface residing on an edge of the active layer, the electro-modulating device has a mounting surface on which there is mounted the modulating element, the mounting surface has securing means for securing the end portion of an optic fibre such that light from the fibre can be coupled into and out of the modulating medium through the input-output surface, and the mounting surface is formed from a silicon substrate having a V-groove etched thereon for receiving the end portion of an optic fibre.

2. An electro-modulating device as claimed in claim 1, wherein the modulating medium is an active layer situated between a first layer of conducting semiconductor and a second layer of conducting semiconductor, the first and second layers of conducting semiconductor forming the electrodes for applying a bias across the modulating medium.

3. An electro-modulating device as claimed in claim 1, wherein the mounting surface has a light guide formed thereon for guiding light into and out of the modulating element.

4. An electro-modulating device as claimed in claim 3, wherein the light guide and modulating medium are formed from a continuous layer of semiconductor.

5. An electro-modulating device as claimed in claim 1, wherein the modulating element has at least one end wall and the reflector is formed by at least one layer of reflective material deposited on the end wall of the modulator element.

6. An electro-modulating device comprising a modulating element, the modulating element having a modulating medium for modulating light passing therethrough, an optical input-output surface by which light both enters the medium prior to modulation of the light and exits the medium after modulation of the light, a light reflector, and electrodes for applying an electric field across the modulating medium, wherein:
   the input-output surface, the medium and the reflector are arranged so that light enters the medium through the input-output surface, travels through the medium towards the reflector, is reflected by the reflector to travel back through the medium towards the input-output surface, and exits the medium through the input-output surface;
   the electric field is transverse to the direction of propagation of light traversing the medium between the input-output surface and the reflector; and
   the refractive index of the medium is responsive to the applied electric field so that the intensity and/or phase of the light exiting the input-output surface is dependent on the applied electric field,
   wherein the modulating element is formed from a section of semiconductor wafer and the modulating medium is formed from an active layer on or in the semiconductor wafer, the active layer having a plurality of edges and the input-output surface residing on an edge of the active layer, and wherein the modulating medium is formed from a layer of InGaAsp, and each electrode is formed from a layer of conducting InP.

7. An electro-modulating device as claimed in claim 6, wherein the modulating medium is an active layer situated between a first layer of conducting semiconductor and a second layer of conducting semiconductor, the first and second layers of conducting semiconductor forming the electrodes for applying a bias across the modulating medium.

8. An electro-modulating device as claimed in claim 6, wherein the electro-modulating device ahs a mounting surface on which there is mounted the modulating element.

9. An electro-modulating device as claimed in claim 8, wherein the mounting surface has securing means for securing the end portion of an optic fibre such that light from the fibre can be coupled into and out of the modulating medium through the input-output surface.

10. An electro-modulating device as claimed in claim 8, wherein the mounting surface has a light guide formed thereon for guiding light into and out of the modulating element.

11. An electro-modulating device as claimed in claim 10, wherein the light guide and modulating medium are formed from a continuous layer of semiconductor.

12. An electro-modulating device as claimed in claim 6, wherein the modulating element has at least one end wall and the reflector is formed by at least one layer of reflective material deposited on the end wall of the modulator element.

13. An electro-modulating device comprising:

a silicon mounting surface having a V-groove etched thereon for receiving an end portion of an optic fibre;

a modulating element being mounted on said mounting surface, said modulating element having a modulating medium for modulating light passing therethrough;

an optical input-output surface by which light enters and exists said mounting medium in a first direction;

a light reflector; and electrodes for applying an electric field in a second direction across said modulating medium, said second direction being transverse to said first direction, said modulating medium having a refractive index responsive to a magnitude of said electric field so that an intensity and/or phase of light exiting said optical input-output surface is dependent on said magnitude.

14. An electro-modulating device as claimed in claim 13, wherein said mounting surface has a light guide formed thereon for guiding light into and out of said modulating element.

15. An electro-modulating device as claimed in claim 14, wherein said light guide and said modulating medium are formed from a continuous layer of semiconductor.

16. An electro-modulating device as claimed in claim 13, wherein said modulating element has an end wall, said reflector being formed by at least one layer of reflective material deposited on said end wall.

17. An electro-modulating device as claimed in claim 13, wherein said modulating medium is formed from a layer of InGaAsP, and said electrodes are formed from a layer of conducting InP.

18. An electro-modulating device as claimed in claim 13, wherein said mounting surface has securing means for securing said end portion.

* * * * *